Figure 3:
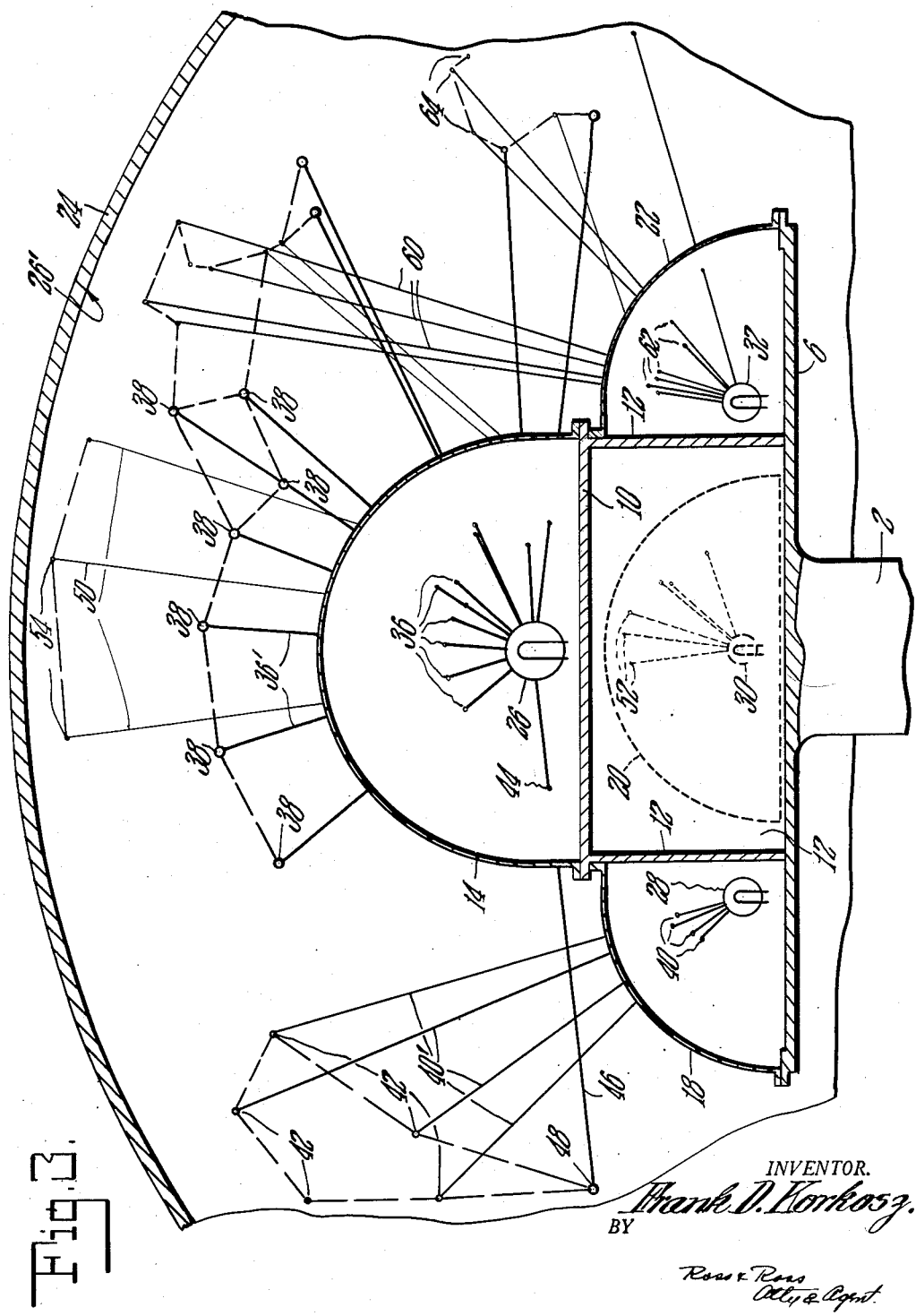

July 6, 1954
F. D. KORKOSZ
2,682,803
LIGHT SPOT PROJECTION APPARATUS FOR
REPRESENTING HEAVENLY BODIES
Filed Dec. 19, 1952
2 Sheets-Sheet 1
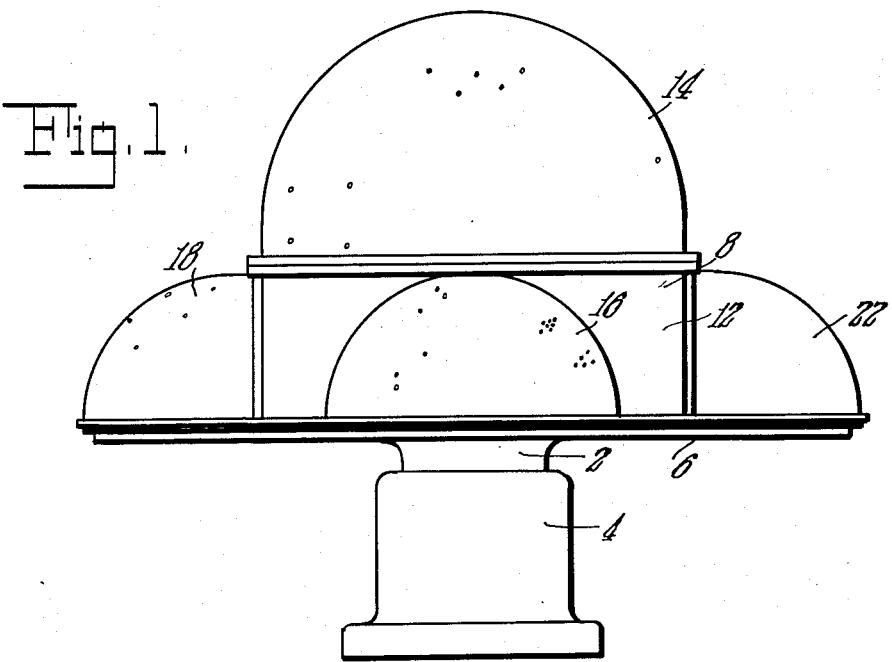
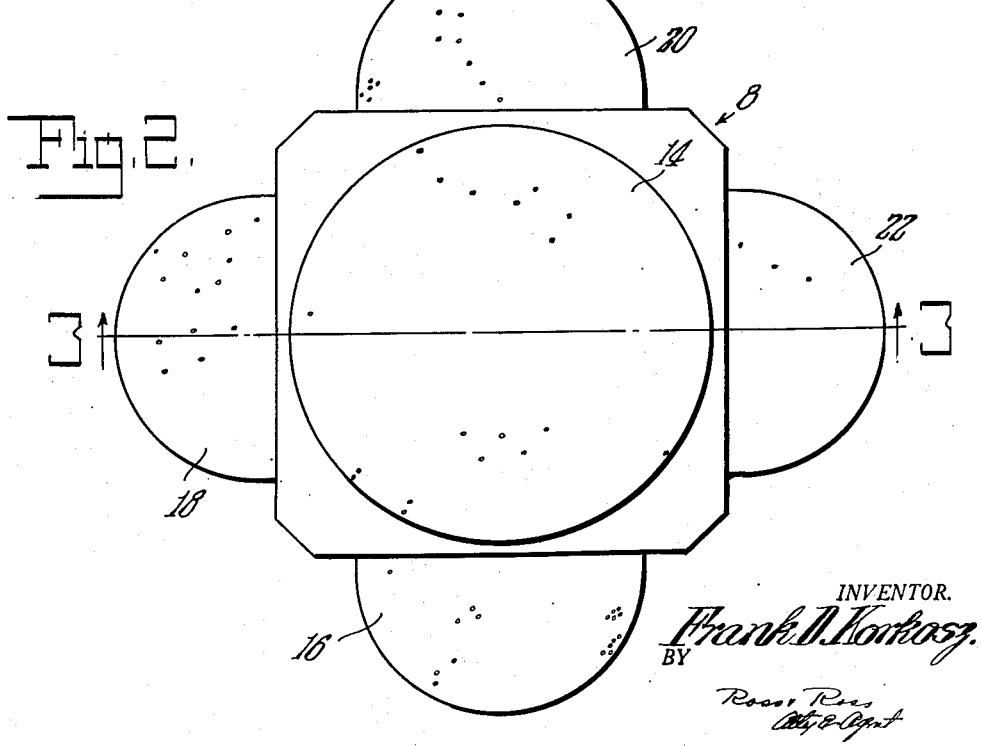
INVENTOR.
Frank D. Korkosz
BY
Ross & Ross
Atty & Agent Patented July 6, 1954

2,682,803

UNITED STATES PATENT OFFICE 2,682,803

LIGHT SPOT PROJECTION APPARATUS FOR REPRESENTING HEAVENLY BODIES

Frank D. Korkosz, Chicopee, Mass.

Application December 19, 1952, Serial No. 326,940

1 Claim. (Cl. 88—24)

My invention relates to improvements in projection apparatus of the general type shown and described in U. S. Letters Patent No. 2,168,799 issued August 8, 1939.

The principal objects and advantages of the present invention are directed to the provision of a novel combination and arrangement of parts in a projection apparatus whereby light spots of different brilliancy representing stars and heavenly bodies of different magnitudes are projected onto a surface such as a dome simulating the sky.

According to special features of the invention, a plurality of lens systems are provided for projecting spots of lights onto a surface over predetermined areas thereof and spots of light of certain intensity are projected from a certain lens system or systems onto an area of surface covered by another lens system or systems whereby spots of light representing stars of different magnitudes may be projected onto a surface in the desired relative arrangements as they may be observed in the sky.

Such is accomplished by the provision of separate compartments having a plurality of lens systems and light sources in association therewith.

All of the above objects I accomplish by means of such structure and relative arrangements of parts thereof, as will fully appear by a perusal of the description below and by various specific features which will be hereinafter set forth.

With the foregoing and various other novel features and advantages and other objects of the invention as will become more readily apparent as the description proceeds, the invention consists in certain novel features of construction and of combination and arrangement of parts as will be pointed out in the claim hereunto annexed and will be fully described in connection with the accompanying drawings wherein:

Figs. 1 and 2 are side elevational and plan views respectively of projection apparatus embodying the novel features of the invention; and Fig. 3 is a sectional view of the apparatus shown in Figs. 1 and 2 on the line 3—3 of Fig. 2 having a portion of the screen dome associated therewith.

Referring now to the drawings more in detail, the invention will be fully described.

The projection apparatus of the invention includes a support 2 which projects from a pedestal 4. The support may be fixed to the pedestal 4 or it may be movable relative thereto as may be desired.

A platform 6 is carried by the support 2 and has a central hollow housing 8 fixed thereto. The housing 8 has an upper wall 10 and side walls 12 resting on the platform 6.

An upper central hollow dome 14 which is semi-spherical in form is supported by the housing 8.

Quarter spherical domes which are hollow are indicated by 16, 18, 20 and 22. They are disposed on the platform 6 and adjacent the side walls of the housing 8.

The components described may be secured together by any well known means such as welding, bolting or the like.

Said components will preferably be formed from rigid material such as metal plate or the like.

A portion of a semi-spherical screen dome is represented by 24 and has an inner surface 26 which will be substantially concentric with the axis of the apparatus.

Each dome is provided interiorily thereof with at least one light source which for illustrative purposes may be a suitable lamp, such as an incandescent lamp.

According to the invention, the lamp or lamps in the different domes will not be all of the same brilliancy. For illustrative purposes, the light sources are represented by 26, 28, 30, and 32 and may, of course, be connected to a suitable source of energy in any well known manner. The light sources are shown in different sizes to illustrate that light 26 is of greater intensity than lights 28 and 32 which are of greater intensity than light 30.

The domes are provided with holes, to be referred to, which are arranged so as to pass light rays onto the surface 26'. The holes in the domes are relatively arranged so that light spots are disposed on the surface in a predetermined relationship, as for instance disposed so as to form a constellation or group of stars in the heavens.

Also certain holes in one dome having a light of certain intensity are arranged to project rays onto an area of the surface onto which rays from a dome having a different intensity are projected.

As a specific illustration, the dome 14 may be provided with openings 36 arranged to transmit light rays in the relationship of the Big Dipper. The rays 36' from these openings 36 provide light spots 38 onto the surface 26' in the relationship of the bodies 38 forming the Big Dipper.

Dome 18 is provided with holes 40 arranged to pass light rays 40' which provide light spots 42 arranged as are the bodies forming the constellation Bootes. A hole 44 in dome passes light rays 46 so that a light spot 48 is also provided in this constellation.

The light source 26 may be such relative to the light source 28 that the spots 42 represent heavenly bodies of the third or fourth magnitude while the spot 48 representing Arctures is of the first magnitude.

The light source 30 in dome 20 will be such that rays 50 through openings 52 produce spots 54 representing bodies of, for example, the second magnitude. Likewise, the light source 32 in dome 22 will be such that rays 60 through openings 62 produce spots 64 representing bodies of still a different magnitude.

Thus light rays are directed from different domes having light sources of different intensity onto the surface within a predetermined portion thereof or in a desired predetermined relationship.

As aforesaid, mechanism may be associated with the pedestal 4 for rotating or oscillating the support 2 on an axis or a plurality of axes.

It will be observed that the area of the surface covered by the angles of projection from one of the light sources in one of the domes may be also covered by other rays from other light sources in other domes.

Specifically, it is desired that the light spots on the surface 26 have relative intensities corresponding to the relative magnitudes of the stars as they actually appear as one observes them in the sky.

Rather than attempt to simulate the different magnitudes of the stars by the relative sizes of the apertures or openings in the domes, it is preferable to employ light sources of different power.

The structure may carry as many systems as desired and there may be any desired number of light sources to provide light spots of any desired magnitudes.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claim are therefore intended to be embraced therein.

What it is desired to claim and secure by Letters Patent of the United States is:

Apparatus for projecting groups of light spots onto a concave spherical surface with light spots of different groups projected upon the same zone of said surface comprising in combination, a central housing support, separate enclosed quarter-spherical domes carried by said central housing support at opposite and adjacent sides thereof, and an upper half-spherical central dome carried by said central housing disposed inwardly of said first-named domes, each of said domes provided with a light source, each of said domes provided with openings for the passage of light rays from said light sources onto a concave spherical surface around and above and spaced from said domes, certain of the openings of one dome relatively arranged to locate spots of light on a certain zone of said surface in simulation of the relationship of certain heavenly bodies, certain openings of another dome relatively arranged to locate other spots of light on said zone in simulation of the relationship of other heavenly bodies with said first-named bodies.

References Cited in the file of this patent

UNITED STATES PATENTS

| Number | Name | Date |
|---|---|---|
| 1,616,736 | Bauersfeld | Feb. 8, 1927 |
| 1,693,969 | Villiger et al. | Dec. 4, 1928 |
| 2,168,799 | Korkosz et al. | Aug. 8, 1939 |
| 2,178,352 | Unglaube et al. | Oct. 31, 1939 |
| 2,483,216 | Marshall | Sept. 27, 1949 |
| 2,632,359 | Spitz | Mar. 24, 1953 |

FOREIGN PATENTS

| Number | Country | Date |
|---|---|---|
| 322,507 | Germany | July 1, 1920 |